United States Patent [19]
Ichijo et al.

[11] Patent Number: 5,267,100
[45] Date of Patent: Nov. 30, 1993

[54] MAGNETIC RECORDING APPARATUS WITH ERRONEOUS RECORDING COMPENSATION

[75] Inventors: Hiroshi Ichijo, Kawasaki; Toshiaki Nishida, Yokohama; Hirohisa Shibuya, Tokyo, all of Japan

[73] Assignee: Kabushiki Kaisha Kenwood, Tokyo, Japan

[21] Appl. No.: 37,689

[22] Filed: Mar. 25, 1993

Related U.S. Application Data

[63] Continuation of Ser. No. 769,763, Oct. 4, 1991, abandoned, which is a continuation of Ser. No. 307,468, Feb. 8, 1989, abandoned.

[30] Foreign Application Priority Data

Feb. 14, 1988 [JP] Japan .................................. 63-31297
Feb. 14, 1988 [JP] Japan .................................. 63-31298

[51] Int. Cl.$^5$ .......................... G11B 5/09; G11B 27/36
[52] U.S. Cl. ....................................... 360/53; 360/31
[58] Field of Search .................... 360/53, 32, 31

[56] References Cited

U.S. PATENT DOCUMENTS

| | | | |
|---|---|---|---|
| 4,415,938 | 11/1983 | Heitmann | 360/31 |
| 4,768,106 | 8/1988 | Ito et al. | 360/32 |
| 4,876,616 | 10/1989 | Katsumata et al. | 360/53 |

*Primary Examiner*—Donald T. Hajec
*Assistant Examiner*—Won Tae C. Kim
*Attorney, Agent, or Firm*—Sixbey, Friedman, Leedom & Ferguson

[57] ABSTRACT

Magnetic recording apparatus for recording data onto a recording medium comprises a rotary drum with recording heads and reproducing heads which are disposed spaced from each other to confirm whether correct data is recorded onto the recording medium. In response to the detection of erroroneous recording, the transfer of new data to the recording heads is interrupted and misrecorded data is re-recorded onto the recording medium.

2 Claims, 2 Drawing Sheets

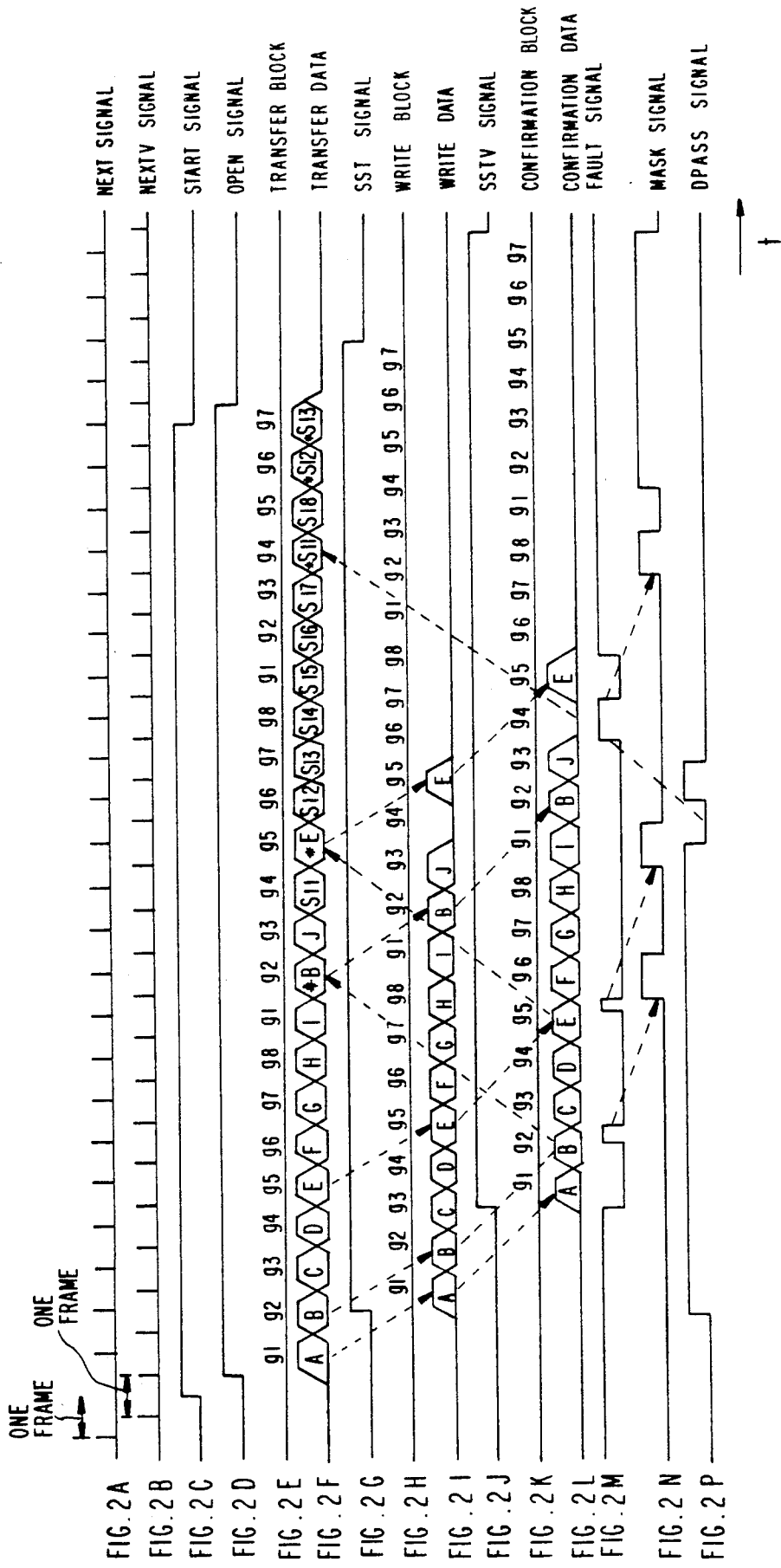

MAGNETIC RECORDING APPARATUS WITH ERRONEOUS RECORDING COMPENSATION

This application is a continuation of Ser. No. 07/769,763, filed Oct. 4, 1991, now abandoned, which itself was a continuation of Ser. No. 07/307,468, filed Feb. 8, 1989, abandoned.

BACKGROUND OF THE INVENTION

The present invention relates to magnetic recording apparatus which record digital data on a magnetic tape using a rotary magnetic head, and more particularly to such apparatus which record data, then read the recorded data and ascertain whether the data is recorded correctly.

Conventionally, there is a magnetic recording apparatus of a fixed magnetic head type which records data, reads the recorded data and ascertains whether the data is recorded correctly using two fixed magnetic heads.

However, this apparatus has the problem that the fixed magnetic heads cannot increase the recording density compared to rotary heads.

It is an object of the present invention to provide a magnetic recording apparatus which performs high-density and high-reliability recording using a rotary magnetic head.

It is another object of the present invention to provide a magnetic recording apparatus which is capable of performing a rapid re-recording when recording fails.

SUMMARY OF THE INVENTION

According to the present invention, a magnetic recording apparatus comprises:

a rotary drum carrying a pair of main magnetic heads at an interval of 180 degrees, and a pair of ascertaining magnetic heads facing each other and provided on the drum at positions deviating by a predetermined angle from the corresponding main magnetic heads;

means for storing digital data externally fed, and having a capacity large enough to store a plurality of unit digital data segments each including a quantity of digital data to be recorded on a magnetic tape by the main magnetic heads when the rotary drum makes a complete rotation;

means for supplying digital data read from the storing means to the main magnetic heads and storing the digital data on the magnetic tape;

means for detecting by comparison a difference between each unit digital data segment reproduced via the ascertaining magnetic heads and the corresponding digital data stored in the storing means; and control means for stopping the writing of each unit digital data segment to be written next in the storing means when the presence of the difference is detected by the detecting means, reading digital data from the storing means when the presence of the difference is detected, and supplying the read data to the recording means.

According to another aspect of the present invention, a magnetic recording apparatus comprises:

a rotary magnetic head carries a pair of main magnetic heads at an interval of 180 degrees, and a pair of ascertaining magnetic heads facing each other and provided on the drum at positions deviating by a predetermined angle from the corresponding main magnetic heads;

first storing means including a plurality of unit storage blocks each including a quantity of digital data recorded on a magnetic tape by the main magnetic heads when the rotary head makes a complete rotation;

second storing means for transferring digital data to the first storing means, and having a capacity larger than that of the first storing means;

means for recording the digital data read from the first storing means onto the magnetic tape by supplying the data to the main magnetic heads;

means for comparing each unit digital data segment reproduced via the ascertaining magnetic heads and the corresponding digital data stored in the storing means; and control means for rendering coincident the timing at which the transfer of unit block digital data from the second storing means to the first storing means is switched and the timing at which the supply of the unit block digital data reproduced by the ascertaining magnetic heads to the comparing means is switched, and for inhibiting the transfer of digital data from the second storing means to the first storing means when there is a difference between the two inputs to the comparing means.

BRIEF DESCRIPTION OF THE DRAWINGS

FIG. 2A-2P is a timing chart explaining the operation of the embodiment of the present invention.

DETAILED DESCRIPTION OF THE EMBODIMENT

Figure 1:
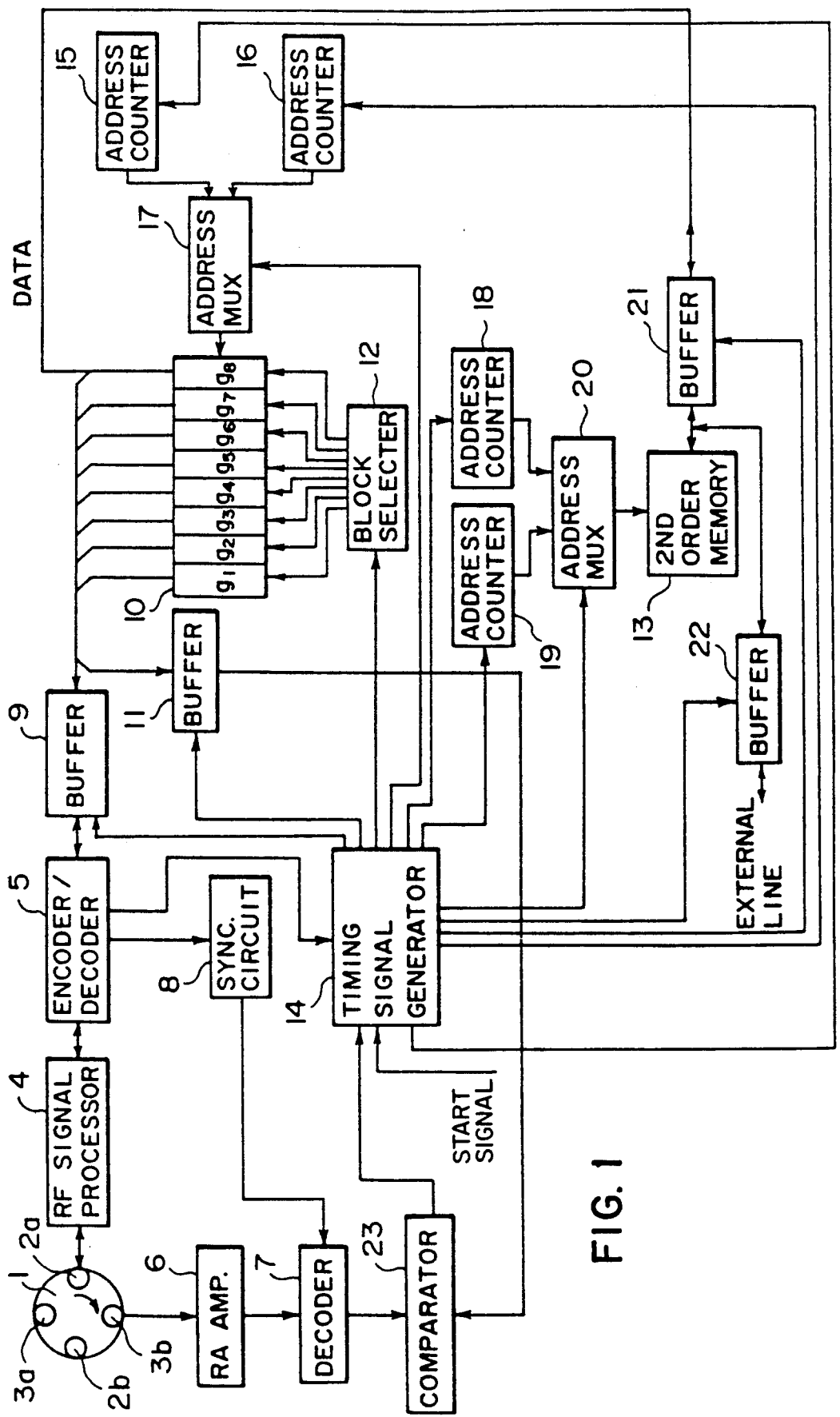
FIG. 1 is a block diagram showing the structure of one embodiment of the present invention.

One embodiment of the present invention will now be described. FIG. 1 is a block diagram showing the structure of an embodiment of the present invention as a magnetic recording and reproduction device. A rotary drum carries a pair of magnetic heads (hereinafter referred also to as main magnetic heads) $2a$ and $2b$ for recording and reproduction provided on drum 1 at an interval of 180°, and a pair of magnetic heads $3a$ and $3b$ for reproduction only (hereinafter referred also to as ascertaining magnetic heads) provided on drum 1 at an interval of 180° and between main magnetic heads $2a$ and $2b$.

An RF signal processor 4 amplifies recorded digital data, supplies the result to magnetic heads $2a$ and $2b$ and amplifies the digital data reproduced by magnetic heads $2a$ and $2b$.

When the supplied digital data is to be recorded, an encoder/decoder 5 encodes the data, inclusive of processing for error correction such as addition of check bits, and supplies the resulting data to RF signal processor 4. In data reproduction, the encoder/decoder 5 decodes the reproduced digital data output by RF signal processor 4 and corrects possible errors included therein.

An RF amplifier 6 amplifies the digital data reproduced by ascertaining magnetic heads $3a$ and $3b$ and delivers the result to a decoder 7 for decoding purposes.

A synchronizing circuit 8 makes the the decoding operation of decoder 7 synchronized with the encoding and decoding operations of encoder/decoder 5.

A buffer 9 is a latch for transferring therethrough digital data from a first order block memory 10 to encoder/decoder 5. First order block memory 10 includes 8 ($=2^3$) blocks $g_1$–$g_8$, each block having a capacity large enough to store digital data for one frame recorded on a magnetic tape when rotary drum 1 makes a complete rotation.

A buffer 11 latches digital data stored in a predetermined area in first order block memory 10 and compared with digital data reproduced via magnetic heads 3a and 3b from a magnetic tape and decoded by decoder 7.

A block selector 12 usually selects one of blocks $g_1, \ldots, g_8$ of first order block memory 10 to be used sequentially in this order. A timing signal generator 14 to be described later in more detail issues a command to select one block of first order block memory 10 such that data exchange is performed between the selected memory block and a magnetic tape through buffer 9 while timing signal generator 14 also issues a command to select a different block such that data exchange is performed between the selected memory block and a second order buffer memory 13 having a larger capacity than first order memory 10.

An address counter 15 designates the respective addresses of the blocks $g_1$-$g_8$ of first order block memory 10 which stores digital data to be recorded via buffer 9 on a magnetic tape and digital data reproduced from a magnetic tape. An address counter 16 designates the respective addresses of blocks $g_1$-$g_8$ of first block memory 10 which stores digital data compared with digital data reproduced by magnetic heads 3a and 3b. Address counter 16 is also used for designating the address of the respective blocks of first order memory block 10 when digital data is transferred between a second order buffer memory 13 and blocks $g_1$-$g_8$ of first order block memory 10.

An address multiplexer 17 selects one of digital address data outputs from address counters 15 and 16 to thereby address first order block memory 10. An address counter 18 is used for designating an address in second order buffer memory 13 when digital data is transferred between one of the blocks $g_1, \ldots, g_8$ of first order block memory 10 and second order buffer memory 13. An address counter 19 is used for designating an address in second order buffer memory 13 when digital data is transferred between the address in second order buffer memory 13 and an external device (not shown).

An address multiplexer 20 selects one of digital address data outputs from address counters 18 and 19 to thereby address second order buffer memory 13.

A buffer 21 latches digital data transferred between first order block memory 10 and second order buffer memory 13. A buffer 22 latches digital data transferred between an external device (not shown) and second order buffer memory 13.

A comparator 23 compares digital data reproduced and decoded through magnetic heads 3a and 3b from a magnetic tape and digital data read via buffer 11 from first order block memory 10 and supplies the result to timing signal generator 14.

Timing signal generator 14 receives a basic timing signal from encoder/decoder 5 and generates a timing signal to transfer digital data between first order block memory 10 and second order buffer memory 13, and timing signals to read and write data from and into first block memory 10 and to record on a magnetic tape. Namely, timing signal generator 14 generates latch strobe signals to buffers 9, 11, 21 and 22, count pulses to address counters 15, 16, 18 and 19, and switching command signals to address multiplexers 17 and 20. Timing signal generator 14 further generates signals OPEN, SST, SSTV, FAULT, MASK, and DPASS. Signal OPEN is generated synchronously with the first NEXTV signal after a start signal is applied to timing signal generator 14 to start the transfer of digital data. Signal NEXTV is a frame timing signal for the ascertaining magnetic head side. Signal NEXT is a frame timing signal for the main magnetic head side. Signal SST indicates that the main magnetic heads perform recording. Signal SSTV indicates that the ascertaining magnetic heads are operating or performing a reproducing operation. Signal FAULT indicates a non-coincidence (difference) detection output when signal SSTV is at high level as the result of the comparison between both the inputs to a comparator 23. Signal MASK inhibits the transfer of digital data from second order buffer memory 13 to first order block memory 10. Signal DPASS is a command of transmission of digital data from first order block memory 10 to encoder/decoder 5 only when signal DPASS is at high level.

Block $g_1, \ldots, g_8$ of the first order block memory to be selected when digital data transferred thereto is stored are hereinafter referred to as a transfer block and blocks $g_1, \ldots, g_8$ of first order block memory 10 to be selected when digital data is recorded on a magnetic tape are hereinafter referred to as a written block.

The operation of the particular embodiment will now be described with reference to FIG. 2. In the example of FIG. 2, 10 digital data segments A, B, . . . , J are intended to be recorded correctly on a magnetic tape. It is assumed that the second and fifth digital data segments B and E are not correctly recorded at a first time and should be re-recorded.

Signal NEXT is output as shown in FIG. 2A at periods determined by a relative speed between the traveling speed of a magnetic tape and the rotational speed of rotary drum head 1. Signal NEXTV is output similarly as shown in FIG. 2B with an angular delay between main magnetic head 2a and ascertaining magnetic head 3a. The distance between adjacent signals NEXT and between signals NEXTV correspond to one frame.

(a) When a start signal is supplied to timing signal generator 14 as shown in FIG. 2C, signal OPEN becomes high to transfer digital data from second order buffer memory 13 to first order memory block 10 as shown in FIG. 2D synchronously with the generation of signal NEXTV, and the blocks $g_1, \ldots, g_8$ are sequentially selected as a transfer block to thereby start the transfer of digital data. The order of selection of the transfer blocks is as shown in FIG. 2E and the transferred digital data is shown in FIG. 2F.

(b) If digital data segments for one frame are written externally into second order buffer memory 13, signal SST becomes high as shown in FIG. 2G, and that digital data stored in the selected block of the first order block memory 10 is recorded on a magnetic tape. The written blocks to be selected are as shown in FIG. 2H and digital data to be recorded is as shown in FIG. 2I.

(c) When digital data for four frames is written into first block memory 10 as described in item (a), ascertaining signal SSTV becomes high as shown in FIG. 2J synchronously with signal NEXTV.

In the particular embodiment, it is assumed that the recorded digital data is read by ascertaining magnetic head 3a and 3b with a delay for four frames magnetic head from the transferred digital data and applied to comparator 23 where it is compared via buffer 11 with the data stored in the corresponding block of first order block memory 10. As described in the item (a), when the digital data for four frames is written to first order block memory 10 from second buffer memory 13 and signal SSTV becomes high, the first-frame digital data recorded on the magnetic tape is reproduced by the ascertaining magnetic heads 3a and 3b at the same timing as the fifth-frame digital data is written from second buffer memory 13. Comparator 23 compares the digital data reproduced by ascertaining magnetic heads 3a and 3b as shown in FIG. 2L and the digital data stored in blocks $g_1, g_2, \ldots$ selected sequentially in this order from first order block memory 10 as shown in FIG. 2K.

In order to enable this comparison, it is arranged that the timing at which the digital data for one frame to be transferred from second order buffer memory 13 to first order block memory 10 is punctuated and the timing at which the data reproduced by ascertaining magnetic heads 3a and 3b is compared by comparator 23 are the same.

(d) By the comparison at the item (c), signal FAULT is output as shown in FIG. 2M when both digital data segments fed to comparator 23 differ or do not coincide. As shown above, the particular embodiment illustrates the instant where the second and fifth digital data segment B and E are not correctly recorded on the magnetic tape and signal FAULT is produced corresponding to the digital data segments B and E in FIG. 2L.

In order that the non-coincident frame digital data is re-recorded on the magnetic tape at a point shifted by four frames by signal FAULT, signal MASK is produced as shown in FIG. 2N. During when signal MASK is being generated, no digital data is transferred from second order buffer memory 13 to first order block memory 10. Thus when there is a non-coincidence, digital data to be transferred next is not transferred from second order buffer memory 13, so that digital data will remain stored in the appropriate block of first order block memory 10. For example, digital data *B following I and *E following $S_{11}$ in FIG. 2F are not transferred from second order buffer memory 13 to first order block memory 10, digital data segments B and E remain in blocks $g_2$ and $g_5$, respectively, of first order block memory 10 as shown in FIG. 2I, and these data segments will be re-recorded on the magnetic tape. In the particular embodiment, 10 digital data segments A-J are recorded on the magnetic tape, and $S_{11}, \ldots, S_{15} \ldots$ in FIG. 2F may be any digital data and are not especially desired to be recorded.

The reason why only when the generated signal DPASS is at a high level, digital data is delivered from first order block memory 10 to encoder/decoder 5 via buffer 9 is that frame digital data shown by $S_{xx}$ in FIG. 2F has been recorded on a magnetic tape and therefore indefinite digital data is delivered from second buffer memory 13 to first order block memory 10. Therefore, the frame digital data shown by $S_{xx}$ is no longer needed and should not be recorded on the magnetic tape.

As described above, according to the present invention, the main magnetic heads and ascertaining magnetic heads are provided on the magnetic head in spaced relationship. Storing means are provided for receiving external digital data to be recorded by the main magnetic heads and storing the data. The digital data to be recorded by the main magnetic heads and the digital data reproduced by the ascertaining magnetic heads are compared to detect the presence of a difference therebetween to thereby detect a failure in the recording of data on the magnetic tape. When a failure in recording on the magnetic tape is detected, the storage of external data in the storing means is temporarily stopped, the digital data which has failed to be recorded is re-read from the storing means and recorded, so that external digital data to be re-recorded need not be received. Thus efficient recording and re-recording are performed to thereby provide a high reliability record. The use of the rotary drum serves to provide a high density record.

As described above, according to the present invention, the main magnetic heads and ascertaining magnetic heads are provided on the magnetic head in spaced relationship. Storing means are provided for receiving external digital data to be recorded by the main magnetic heads and storing the data. The digital data to be recorded by the main magnetic heads and the digital data reproduced by the ascertaining magnetic heads are compared to detect the presence of a difference therebetween to thereby detect a failure in the recording of data on the magnetic tape. When a failure in recording on the magnetic tape is detected, the storage of external data in the storing means is temporarily stopped, the digital data which has failed to be recorded is re-read from the storing means and recorded, so that external digital data to be re-recorded need not be received. Thus efficient recording and re-recording are performed to thereby provide a high reliability record. The use of the rotary magnetic head serves to provide a high density record.

As described above, according to the present invention, the timing at which the transfer of digital data for unit block from the second storing means to the first storing means is switched is rendered coincident with the timing at which digital data for unit block to be fed to the comparison means and reproduced by the ascertaining magnetic heads is switched. When there is a difference between both inputs to the comparison means to be compared, the transfer of digital data from second storing means to the first storing means is inhibited. Therefore, the previous digital data for unit block is maintained stored in the first storing means and will be re-recorded on the magnetic tape.

The digital data to be re-recorded is managed by hardware, and processed rapidly. The fact that the capacity of the second storing means is selected so as to be larger than that of the first storing means serves to seemingly increase the transfer speed of digital data greatly to thereby improve a throughput.

A recording format can be formed on the second storing means, so that any format can be formed as desired.

What is claimed is:

1. Magnetic recording and reproduction apparatus comprising:

memory means provided with a predetermined number of blocks, for temporarily storing each of a sequence of data frames received from a data source, each block having a capacity to store one frame of data;

address means for cyclically transferring the received sequence of data frames for recording to respective blocks of said memory means for subsequent recording and for cyclically updating the stored contents of the blocks in said memory means in repeating updating cycle;

mean for cyclically reading out, in a repeating readout cycle, the sequence of data frames from the blocks of said memory means;

magnetic recording and reproduction means provided with a magnetic main head and a magnetic subhead, the main head receiving the sequence of data frames read-out from the blocks in said memory means and recording the received data frames onto a recording tape, and the sub-head reading out the recorded data frames from the recording tape;

error identifying means for detecting a coincidence between each of the data frames read-out by said subhead with the corresponding data frame retrieved from said memory means and identifying any recorded data frame as a recording error data frame and the block which stores the corresponding data frame for recording when said coincidence is not detected; and means for inhibiting the address means from updating the stored contents of any block identified by said error identifying means in a next updating cycle so as to retain the data frame which corresponds to the recording error data frame until after the data frame in the previously identified block has been read out again in a next read-out cycle.

2. Magnetic recording and reproduction apparatus according to claim 1, wherein said magnetic recording means is a rotary magnetic recording unit where the main head and sub-head are arranged on a rotary drum with a spaced distance therebetween.

* * * * *